United States Patent
Schuck

(10) Patent No.: US 9,047,873 B2
(45) Date of Patent: Jun. 2, 2015

(54) SELF CONTAINED BREATHING AND COMMUNICATION APPARATUS

(71) Applicant: Draeger Safety Inc., Pittsburgh, PA (US)

(72) Inventor: Joseph C. Schuck, Mcmurray, PA (US)

(73) Assignee: Draeger Safety, Inc., Pittsburgh, PA (US)

(*) Notice: Subject to any disclaimer, the term of this patent is extended or adjusted under 35 U.S.C. 154(b) by 222 days.

(21) Appl. No.: 13/724,049

(22) Filed: Dec. 21, 2012

(65) Prior Publication Data

US 2014/0180686 A1 Jun. 26, 2014

(51) Int. Cl.
*G10L 15/00* (2013.01)
*G10L 15/26* (2006.01)

(52) U.S. Cl.
CPC .................... *G10L 15/265* (2013.01)

(58) Field of Classification Search
CPC ........ G10L 15/20; G10L 15/26; G10L 15/265
USPC .................. 704/2, 235; 128/201.19
See application file for complete search history.

(56) References Cited

U.S. PATENT DOCUMENTS

| | | | | |
|---|---|---|---|---|
| 5,913,307 | A * | 6/1999 | Taieb et al. | 128/205.23 |
| 8,316,850 | B2 * | 11/2012 | Grilliot et al. | 128/205.22 |
| 2002/0196202 | A1 * | 12/2002 | Bastian et al. | 345/8 |
| 2013/0289971 | A1 * | 10/2013 | Parkinson et al. | 704/2 |

OTHER PUBLICATIONS

Working Under Fire. The Dräger FPS 7000 Full-Face Masks and Systems Accessories. [online] Dräger Safety, 2012 [Retrieved on Dec. 5, 2012]. Retrieved from the Internet: <URL: www.ferret.com. au/ODIN/PDF/Showcases/101244.pdf>.
Oceanic. Datamask Hud. Screenshot [online]. Oceanic, 2012 [retrieved Oct. 16, 2012]. Retrieved from the Internet: <URL: http://www.oceanicworldwide.com/us/datamask-hud/#>.
Oceanic. Datamask™ Mask/Dive Computer Operating Manual. Manual [online]. Oceanic. 2002, Updated Oct. 22, 2007. [Retrieved on Dec. 16, 2014] Retrieved from the Internet: <http://www.oceanicworldwide.com/us/media/wysiwyg/manuals/12-2736-r02.pdf>.
*The future of firefighting—A HMD-AR UI concept for first responder.* Tanagram. Madtown Media. Aug. 18, 2011. YouTube. Video. Web. [Retrieved on Dec. 16, 2014]. Retrieved from the Internet: <URL: https://www.youtube.com/watch?v=QBAnr2qQTH0>.

* cited by examiner

*Primary Examiner* — Daniel Abebe
(74) *Attorney, Agent, or Firm* — Mintz Levin Cohn Ferris Glovsky and Popeo, P.C.

(57) ABSTRACT

A self-contained breathing and communication apparatus is described that can facilitate communication between a first user and a second user. A microphone can record sound when the first user speaks. The microphone can convert the recorded sound to a voice signal. A voice activity detection processor can detect spoken words and informative sounds of the first user from the converted voice signal. For this detection, the voice activity detection processor can remove noise from the voice signal. A voice-to-text processor can convert the detected words and informative sounds to a text message. A transmitter of the transmitting module can transmit the text message to a receiver of the second user via a communication network. A display device of the second user can display the text message on a graphical user interface. Related methods, apparatus, systems, techniques and articles are also described.

21 Claims, 11 Drawing Sheets

SELF CONTAINED BREATHING AND COMMUNICATION APPARATUS

TECHNICAL FIELD

The subject matter described herein relates to a self-contained breathing apparatus with an enhanced communications interface.

BACKGROUND

Conventionally, emergency workers, such as firefighters, use a breathing apparatus to breathe oxygen during an emergency, such as a fire hazard. These emergency workers communicate with each other using radio communication devices, such as walkie-talkies. These conventional communication devices are implemented and packaged separately from the breathing apparatus. It can be inconvenient for an emergency worker to simultaneously manage both the breathing apparatus and a communication device. Additionally, the communication may not be clear when two or more emergency workers speak at the same time to communicate with another emergency worker, as voice messages by those two or more emergency workers can overlap, thereby creating confusion amongst the emergency workers.

SUMMARY

A self-contained breathing and communication apparatus is described that can facilitate communication between a first user and a second user. A first apparatus can include a microphone that can detect sound when the first user speaks and convert the sound to a voice signal. A voice activity detection processor can detect spoken words and informative sounds from the first user's voice signal. For this detection, the voice activity detection processor can remove noise from the voice signal. A voice-to-text processor can convert the detected words and informative sounds to a text message, such as a written or visual message. A transmitter of the transmitting module can send the message to a receiver on second apparatus, similar to the first, used by the second user. The message can be sent via a communication network. A display device of the second apparatus can display the visual, or text, message on a graphical user interface. Alternatively, the voice signal can be sent from the first apparatus to the second apparatus and voice-to-text conversion can be done by the second apparatus prior to displaying the visual message. Related methods, apparatus, systems, techniques and articles are also described.

Provided herein is a communications apparatus that includes a microphone, a voice activity detection processor, a voice-to-text processor, a transmitter, a receiver, a protective facemask, and a display device. The microphone receives sound when a user speaks and converts the received sound into a voice signal. The voice activity detection processor detects spoken words and informative sounds within the voice signal. The voice-to-text processor converts the spoken words and informative sounds into a text message. The transmitter is configured to transmit the voice signal, the text message, or both the voice signal and text message to other users. The receiver is configured to receive one or more voice signals, text messages, or voice signals and text messages from one or more users via a communication network. The display device displays the one or more text messages from the one or more users, and the display device is adjacent or integral to the protective facemask.

The following features can be part of a communications apparatus as described above in any suitable combination. The user and the other one or more users can be firefighters in some implementations. The sound received by the microphone can include the spoken words and the informative sounds by the user and noise. The voice signal can be an electrical signal characterizing the sound. The voice activity detection processor can include an energy based detector, a spectral flatness based detector, a sub-band energy based detector, a zero crossing rate and absolute value based detector, and a controller to detect the spoken words and the informative sounds by the user based on voice detections by the energy based detector, the spectral flatness based detector, the sub-band energy based detector, and the zero crossing rate and absolute value based detector. The energy based detector can detect voice based on energies within the voice signal. The spectral flatness based detector can detect voice based on spectral flatness within the voice signal. The sub-band energy based detector can detect voice based on energies of sub-bands within the voice signal. The zero crossing rate and absolute value based detector can detect voice based on zero crossing rates and absolute values within the voice signal. In some implementations of the apparatus, the voice-to-text processor can include a dictation apparatus to convert the spoken words and informative sounds into the text message. The transmitter can include a power supply, an electronic oscillator, modulator, a power amplifier, and an impedance matching circuit in some implementations. In such implementations, the power supply provides power to the transmitter; the electronic oscillator generates a carrier wave for transmitting the text message; the modulator modulates a signal characterizing the text message on the carrier wave; the power amplifier varies an amplitude of the signal that is modulated on the carrier wave; and the impedance matching circuit matches impedances of antennas of the transmitter and the receiver. Some implementations can include those in which the display device is a transparent organic light emitting diode (OLED) device embedded in a facemask of the user. Implementations of the apparatus can include a breathing circuit that provides gas to the user. In such implementations, the gas can be a controlled quantity of oxygen.

In a related aspect, a method is provided which includes converting sound received from a first user wearing a first self-contained breathing apparatus into a voice signal, detecting spoken words and informative sounds by the first user from the voice signal, converting the spoken words and informative sounds into a text message, and transmitting the text message to a second user. In such methods, the transmitted text message is displayed for the second user on or adjacent to a protective facemask of a second self-contained breathing apparatus.

The following features can be part of a method as described above in any suitable combination. The microphone can convert the received sound into the voice signal in some implementations. Some implementations can include those in which a voice activity detection processor detects the spoken words and informative sounds from the voice signal. In some implementations, a voice-to-text processor converts the spoken words and informative sounds into the text message. A transmitter can transmit the text message to the second user. Implementations of the methods include those in which the transmitted text message is displayed on a display device of the second user.

A further related aspect provides a method that includes converting spoken words and informative sounds of a first user wearing a first self-contained breathing apparatus into a voice signal, converting the voice signal into a text message, and transmitting the text message to a second user. In such implementations, the transmitted text message is displayed for the second user on or adjacent to a protective facemask of a second self-contained breathing apparatus. In some such implementations, a microphone of the first self-contained breathing apparatus converts the spoken words and informative sounds of the first user into the voice signal, a voice-to-text processor of the first user converts the voice signal into the text message, and a transmitter of the first self-contained breathing apparatus transmits the text message to the second user. A graphical user interface of a display device of the second self-contained breathing apparatus displays the transmitted text.

Another related aspect provides a method that includes converting spoken words and informative sounds of a first user wearing a first communication apparatus into a voice signal, transmitting the voice signal to a second user, converting the voice signal into a visual message, and displaying the visual message for the second user on or adjacent to a facemask of a second communication apparatus. In some such implementations, the communication apparatus can include a self-contained breathing apparatus. Further, the facemask of such implementations can be a protective facemask.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the communication between the users includes sending text messages characterizing voice messages by the different users. When two or more users speak simultaneously to a first user, a mere voice signal with multiple voices can become difficult to comprehend. However, different text messages for those different voices can clarify to the first user the exact subject matter and sender of each message, thereby preventing any confusion and increasing work efficiency of the users.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
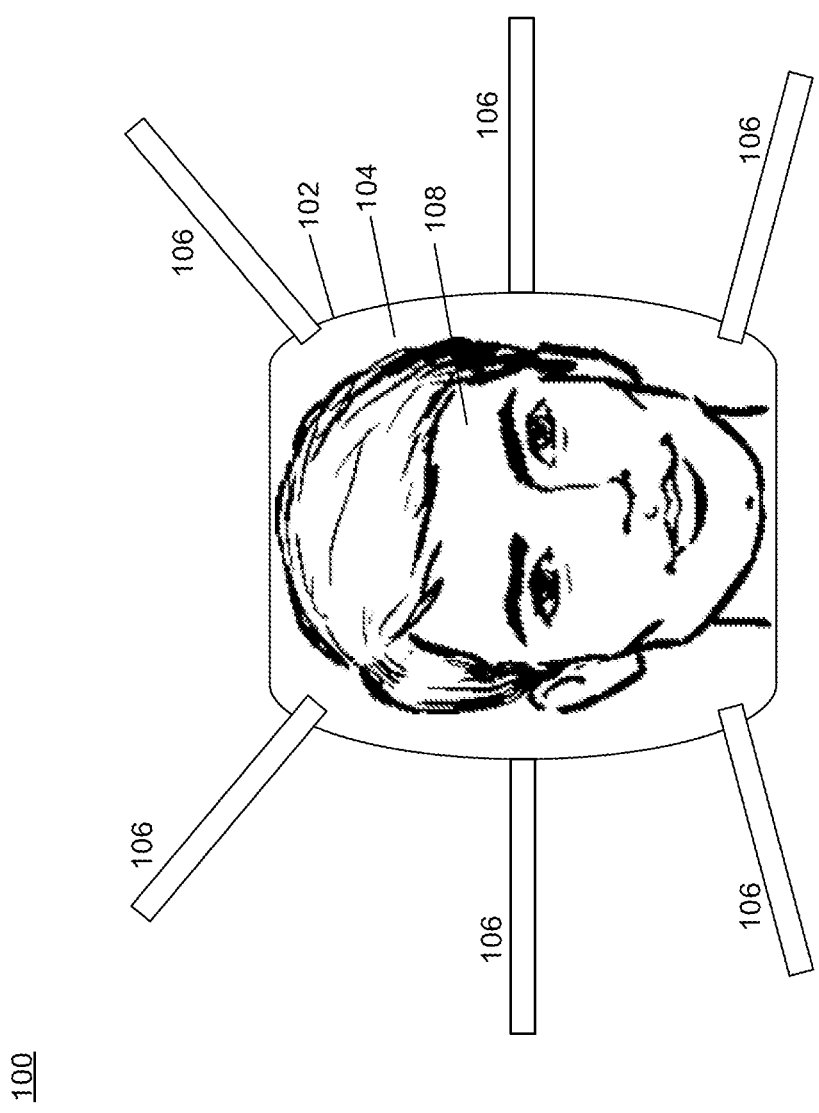
FIGS. 1 and 1A are a simplified diagram illustrating a self-contained breathing and communication apparatus.

FIG. 1 is a simplified diagram 100 illustrating a self-contained breathing and communication apparatus 102 that can be used by a user. The self-contained breathing and communication apparatus 102 can include a facemask 104, straps 106, a breathing circuit, and a communication system. The user can be an emergency worker, such as a firefighter, an earthquake rescuer, a flood lifeguard, and any other emergency worker. In some alternate implementations, the user can be a robot that communicates with other robots and/or human users.

The facemask 104 can be fitted over a face 108 of a user. The facemask 104 can be made of a material that is resistant to high temperatures and a high mechanical stress. This material can be a polymer, such as a silicone. Although silicone is described, other polymers can also be used, such as one or more of: synthetic rubber, bakelite, neoprene, nylon, poly vinyl chloride, polystyrene, polyethylene, polypropylene, polyacrylonitrile, poly vinyl butyral, and other polymers. The facemask 104 can have different sizes and dimensions based on a size of the face 108 of the user. In one implementation, the sizes can be small, medium, large, extra-large, or any other size.

Straps 106 can be used to strap the self-contained breathing and communication apparatus 102 around a face 108 of the user. The straps 106 can be made of a material that can withstand high temperatures. In one example, the straps 106 can be made of rubber. In another example, the straps 106 can be made of one or a combination of: fabric, rubber, plastic, and the like. The straps 106 can have different sizes and dimensions based on a size of the face 108 of the user. In one example, the sizes can be small, medium, large, extra-large, or any other size.

The breathing circuit and the communication system in the self-contained breathing and communication apparatus 102 can include electrical circuitry that can be insulated from contaminants, such as gas, water, fire, chemicals, and other contaminants. This insulation can be performed by selectively potting some sections of the circuitry. In one example, the power source of the apparatus 102 may not be potted while other electrical components of the apparatus 102 can be potted. Such a configuration protects the circuitry because if a contaminant enters the circuitry, the power supply will fail before temporarily or permanently failing other crucial and expensive electrical components.

Figure 1A:
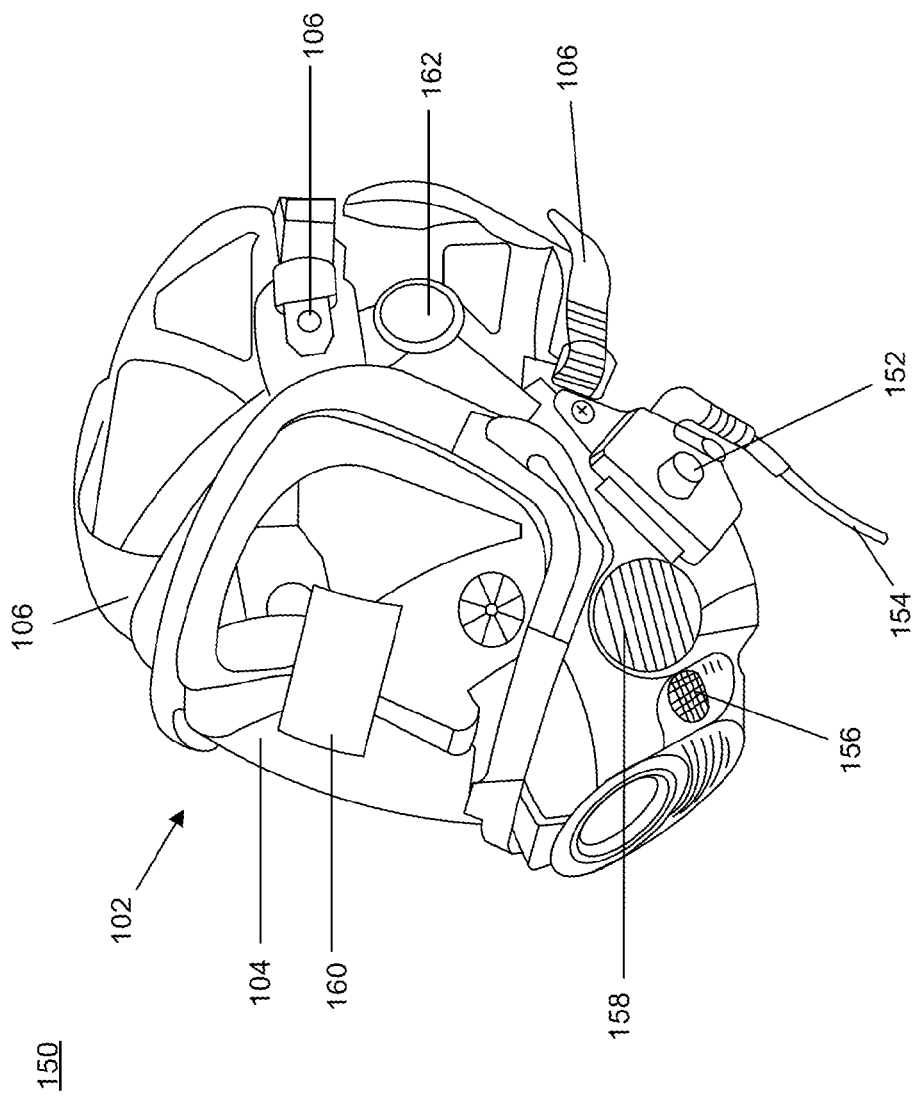

FIG. 1A is a diagram 150 illustrating one example of a self-contained breathing and communication apparatus 102 that can be used by a user. The self-contained breathing and communication apparatus 102 can include a facemask 104, straps 106, a push-to-talk system 152, a connecting cable 154, a microphone 156, a voice amplifier 158, a display device 160, an optional speaker 162, and other electronic components, as described below with respect to diagram 300.

When a first user desires to communicate with another user, the first user can record sound by pressing a button on the push-to-talk system 152 and speaking into the microphone 156. The push-to-talk system 152 can be connected to the self-contained breathing and communication apparatus 102 via the connecting cable 154. Signal processing can be performed on this recorded sound to generate a text message, which is then sent and displayed on a display device of the second user. This signal processing is described in more detail below. The display device 160 of the first user can display text characterizing spoken words and informative sounds (for example, shouting, crying, laughing, hissing, whistling, and other sounds) of the second user and other users. Besides transmitting the text, the voice signal of the second user and other users can additionally or alternatively be transmitted, and the first user can hear the spoken words and informative sounds of the second user via the speaker 162. In this context, a text message can include any type of written or visual message that can be transmitted and displayed by the self-contained breathing and communication apparatus, in addition to written messages transmitted via cellular phone technology.

Although the display device 160 is shown as being embedded within the lens of the facemask 104, in other implementations, the display device 160 can be outside the self-contained breathing and communication apparatus 102. For example, the display device can be an external tablet computer or any other device with a screen. The external tablet computer and other devices with the screen can be either held in the hands of the user or affixed to some apparel (for example, arm sleeves) of the user.

Figure 2:
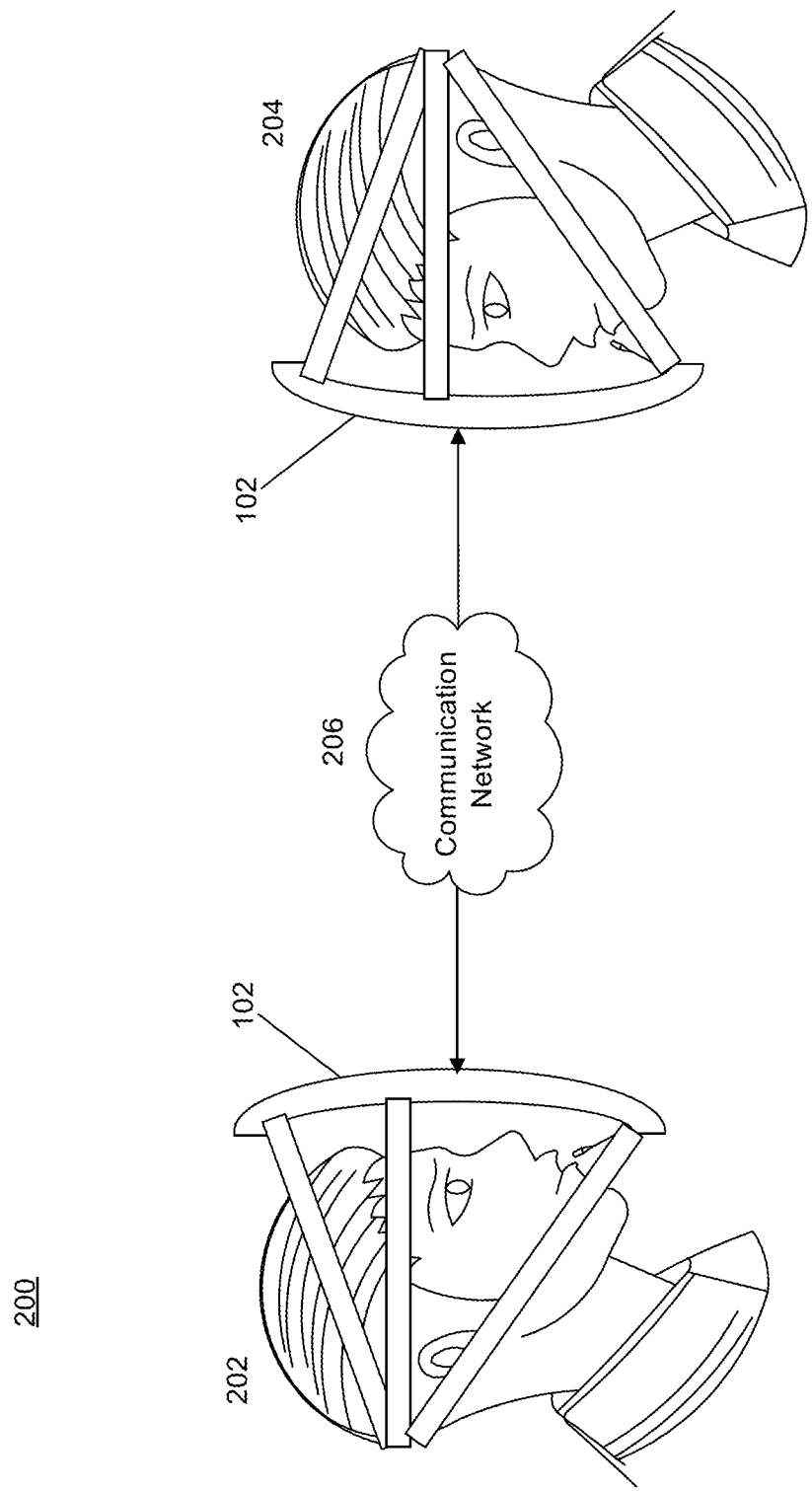
FIG. 2 is a diagram illustrating a communication between a first user and a second user.

FIG. 2 is a diagram 200 illustrating a communication between a first user 202 and a second user 204, each with a self-contained breathing and communication apparatus 102. When the first user 202 says something or makes an informational sound, the self-contained breathing and communication apparatus 102 of the first user 202 can send, via a network 206, a message characterizing any spoken words and/or informational sounds to the self-contained breathing and communication apparatus 102 of the second user 204. The network can be one of: a radio frequency network, a Bluetooth network, an infrared network, internet, a local area network, wide area network, metropolitan area network, a cellular area network, and other networks.

Figure 3:
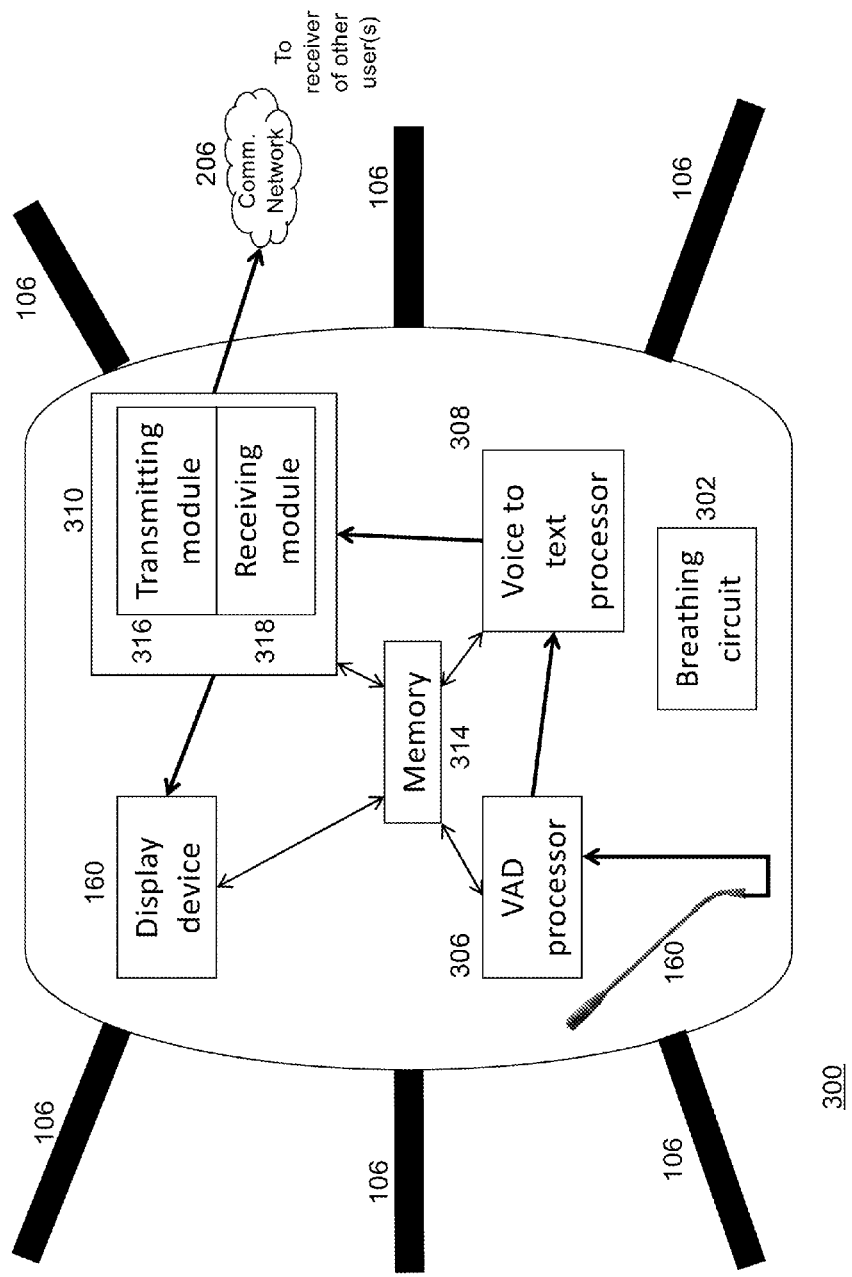
FIG. 3 is a simplified diagram illustrating components of the self-contained breathing and communication apparatus.

FIG. 3 is a simplified diagram 300 illustrating components of the self-contained breathing and communication apparatus 102. The self-contained breathing and communication apparatus 102 can include a breathing circuit 302, a microphone 156, a voice activity detection (VAD) processor 306, a voice-to-text processor 308, a communication server 310, a display device 160, and a memory 314. In some implementations, each processor can include one or more computers.

The breathing circuit 302 can be a system that provides breathing gas to the user. The breathing gas can include at least one of oxygen, carbon dioxide, nitrogen, helium, and other gases. In one example, the breathing circuit provides controlled quantity of oxygen to a firefighter during a fire.

When a user speaks and/or makes a sound, the microphone 156 can receive spoken words and other informational sounds from a mouth of a user. The microphone 156 can convert the spoken words and other informational sounds to a voice signal. The voice signal can be an electrical signal with amplitude and frequency that can vary at different places in the electrical signal. The voice signal can include noise. Noise can include sounds and/or voice of other users; babble noise; noise related to the emergency including sirens, explosions, and other non-verbal sounds; and other signal noises. The voice signal with noise can pass to the voice activity detection processor 306 for detection of spoken words and informational sounds.

The voice activity detection processor 306 can receive the voice signal with noise from the microphone 156. The voice activity detection processor 156 can detect the spoken words and informational sounds of the user from the received voice signal with noise and produce a processed voice signal. The processed voice signal can be free of noise or may have a minimal/insignificant noise. The voice activity detection processor 306 can send the processed voice signal to the voice-to-text processor 308.

Although the voice activity detection processor 306 is described to detect spoken words and informational sounds of the user, in some other implementations, the microphone 156 can first receive the spoken words and informational sounds without noise (or minimal noise), and then convert the detected spoken words and informational sounds to a voice signal that has no noise or minimal noise.

The voice-to-text processor 308 can receive the processed voice signal that has no or minimal noise from the voice activity detection processor 306. The voice-to-text processor 308 can convert the processed voice signal that has no or minimal noise to text. The text generated by the voice-to-text processor 308 can identify the speaker or origin of the processed voice signal used to generate the text. The voice-to-text processor 308 can send the converted text to the communication server 310.

The communication server 310 can include a transmitting module 316 and a receiving module 318. The transmitting module 316 can include one or more transmitters. The receiving module 318 can include one or more receivers. The transmitting module 316 can receive the text from the voice to text processor 308. The one or more transmitters of the transmitting module 316 can transmit, via a communication network, the signal to a receiving module of a communication server of the one or more users that are within a threshold distance from the first user. The threshold value of this distance can be based on the communication capability, such as a distance of communication allowed by the communication network. The transmitted text can be displayed to those other one or more users. The receiving module 318 can receive text generated by the voice-to-text processor of the one or more users. The receiving module 318 can then send the received text to the display device 160.

The display device 160 receives the text characterizing voice and informative sounds of other users from the receiving module 318. The display device 160 can be a transparent organic light emitting diode (OLED) device embedded within a lens of the facemask 104. Although a transparent OLED device is described, other display devices are also possible, such as cathode ray tube device, a liquid crystal display, a light emitting diode display, or any other display device. The display device 160 can display the received text.

The self-contained breathing and communication apparatus can receive spoken words and informational sounds from a user through a microphone 156, generate a voice signal, and then transmit that voice signal through the transmitting module 316 over the communications network. A second self-contained breathing and communication apparatus can receive the voice signal via its receiving module 318. Noise removal and voice-to-text conversion can take place on the voice activity detection processor 306 and voice-to-text processor 308 of the second self-contained breathing and communication apparatus. Also, it is possible that the transmitting module 316 and receiving module 318 of the self-contained breathing and communication apparatus can include multiple types of transmitters and receivers, respectively, so that both audio and visual messages can be sent and received. In that way, a user can hear, as well as see, information from other rescue workers in the vicinity. Alternatively, if one member of the rescue team is equipped with a conventional self-contained breathing apparatus, rescue workers with the self-contained breathing and communication apparatus described herein can communicate with that member via conventional audio means.

The memory 314 can interact with the microphone 156, the voice activity detection processor 306, the voice-to-text processor 308, the communication server 310, and the display device 160, and can store associated data. The memory 314 can be either one or a combination of a volatile memory and a non-volatile memory. The volatile memory can be one or more of: a dynamic random access memory, a fast central processing unit cache memory, a static random access memory, and the like. The non-volatile memory can be one or more of: a read-only memory, a flash memory, a ferroelectric random access memory, magnetic computer storage devices (for example, a hard disk, a floppy disk, and a magnetic tape), optical discs, paper tape and punch cards, and the like.

Figure 4:
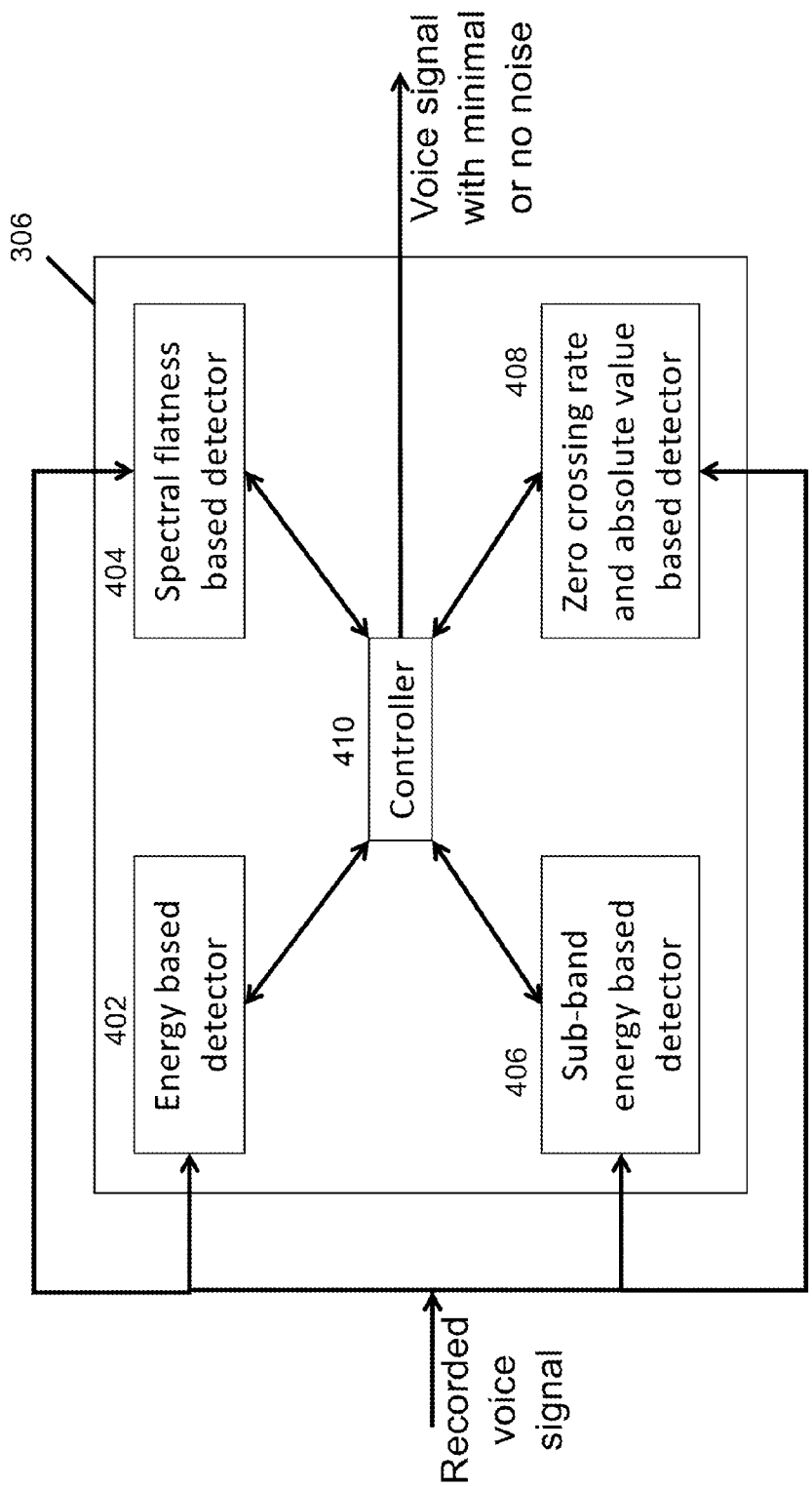
FIG. 4 is a simplified diagram illustrating a voice activity detection processor.

FIG. 4 is a simplified diagram 400 illustrating a voice activity detection processor 306. The voice activity detection processor can include an energy based detector 402, a spectral flatness based detector 404, a sub-band energy based detector 406, a zero crossing rate and absolute value based detector 408, and a controller 410.

The energy based detector 402 can detect voice and informative sounds of the user from a noisy voice signal by detecting portions of the noisy voice signal that have energy more than a threshold level. This detection is based on a presumption that voice active regions of the noisy voice signal have an energy that is greater than the energy of noise portions of the noisy voice signal.

The spectral flatness based detector 404 can detect voice and informative sounds of the user from a noisy voice signal by detecting portions of the noisy voice signal that have a spectral variance that is more than a threshold level. This detection is based on a presumption that voice active regions of the noisy voice signal have a spectral variance that is greater than a spectral variance of noise portions of the noisy voice signal, as the noise portions generally have flat spectral characteristics.

The sub-band energy detector 406 can convert the time signal to a frequency signal by using a transform (for example, a Fourier transform, including a short term Fourier transform (STFT)) and then dividing the voice signal into small portions/bands of different frequency ranges. The sub-band energy detector 406 can then detect voice and informative sounds of the user for each band separately by applying separate threshold levels of energy. This detection is based on a presumption that that voice active regions within the particular band of the noisy voice signal have an energy that is greater than the energy of noise portions within the particular band of the noisy voice signal.

The zero crossing rate and absolute value based detector 408 can detect voice and informative sounds of the user based on a detection of zero crossing rate and an absolute value of amplitude. Initially, the detector 408 can determine an absolute value of the amplitude. If the absolute value of the amplitude for a particular region of the noisy voice signal is above a threshold level, the particular region characterizes voice and informative sounds of the user. If the absolute value of the amplitude for a particular region of the noisy voice signal is above a threshold level, the detector 408 can determine a zero crossing rate of the noisy voice signal in the particular region.

The zero crossing rate is a number of zero crossings (that is, mathematical sign changes of the signal) per distance of the particular region. The detector 408 can then determine some regions that have zero crossing rates more that another threshold level. These regions characterize low-energy voice regions, such as whispers, which may be missed by the energy based detector 402.

The controller 410 can interact with the energy based detector 402, spectral flatness based detector 404, sub-band energy detector 406, and zero crossing rate and absolute value based detector 408. The controller 410 can compare detection results of each of the energy based detector 402, the spectral flatness based detector 404, the sub-band energy detector 406, and the zero crossing rate and absolute value based detector 408. Based on this comparison, the controller 410 can determine appropriate voice and informative sounds for each region of the noisy voice signal. The determined appropriate voice and informative sounds of the user can be free from false voice detections or have minimal false voice detections. The controller 410 can output and send this voice signal, including the determined appropriate voice and informative sounds, to the voice-to-text processor 308 or to the transmitting module 316

Figure 5:
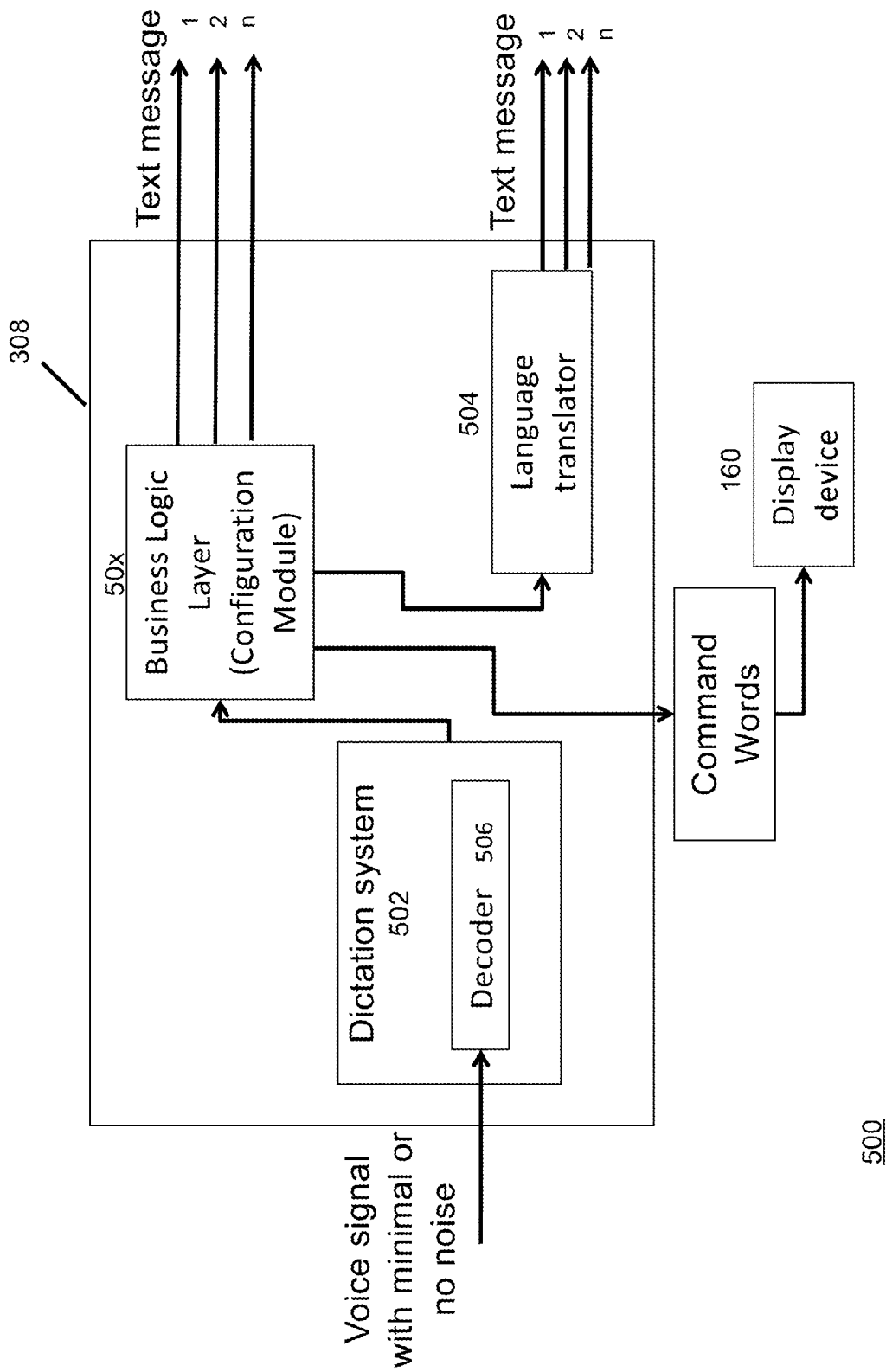
FIG. 5 is a simplified diagram illustrating a voice-to-text processor.

FIG. 5 is a simplified diagram 500 illustrating a voice-to-text processor 308. The voice-to-text processor can include a dictation system 502 and a language translator 504. The dictation system 502 can include a decoder 506. The decoder 506 can receive the voice signal including voice and informative sounds of the user from the controller 410. The decoder 506 can then decode/translate the received voice signal to text. The decoder 506 can send the text to the language translator 504 if the user selects and desires the text to be shown in a different language. The language translator 504 can translate the text into the display language specified by the user. The language translator 504 can then send the translated text to the communication server 310. The translation can be based on a dictionary of a plurality of languages that can be stored in the memory 314. The dictation system 502 can train the dictionary based on at least one of accent, pronunciation, articulation, roughness, nasality, pitch, volume, and speed of voice (that is, rate of speaking words) of the user. In some implementations, the dictionary can be trained in real-time.

If the receiving or viewing user does not specify the text to be displayed in another language, the language translator 504 can merely output the received text in the same language without performing any translation. The language translator 504 can send the resulting text to the communication server 310.

In some implementations, when a user begins to use the self-contained breathing and communication apparatus 102, the user can be provided an option to set a first language in which the user desires to communicate with other users, and to set a second language in which the user desires to read messages from other users. The first language and the second language can be same in one implementation, and different in another implementation. The voice signal receiving and decoding can occur in the same language.

Other implementations may include those in which the self-contained breathing and communication apparatus 102 receives a message that has been translated into text and then translates the text into the language chosen by the user for display. A language translator connected to the receiving module 318 can receive and translate the message prior to display of the text on the display device 160. The text language translator can be a separate translator from the language translator 504 located in the voice to text processor 308. Alternatively, the text language translator and the language translator 504 in the voice to text processor 308 can be one and the same.

Figure 6:
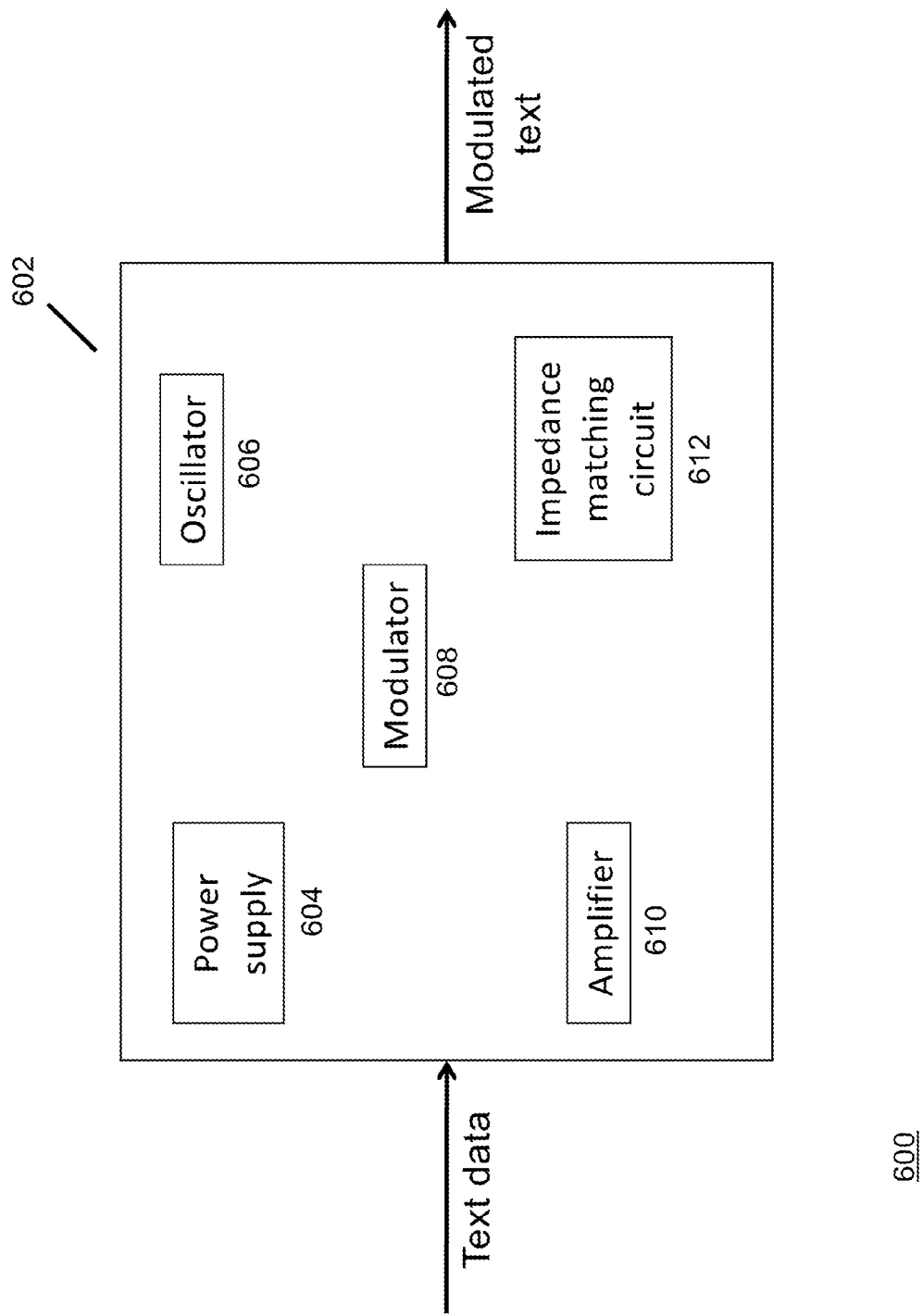
FIG. 6 is a simplified diagram illustrating a transmitter of the transmitting module.

FIG. 6 is a simplified diagram 600 illustrating a transmitter 602 of the transmitting module 316. The transmitter 602 can receive the text from the voice-to-text processor 308. The transmitter 602 can then transmit the text to a receiver of other one or more users. The transmitter 602 can include a power supply 604, an electronic oscillator 606, a modulator 608, a power amplifier 610, and an impedance matching circuit 612.

The power supply 604 can supply power to the transmitter 602. The power supply 604 can be operated by electricity, light or sun (solar), fuel, or other sources. The power supply 604 can be a battery, one or more cells (for example, AA, AAA, and other types of cells), or can have other forms.

The electronic oscillator 606 can generate a carrier wave, such as a radio frequency signal. In one example, the electronic oscillator 606 can be a crystal oscillator, whose frequency is associated with vibrations of a quartz crystal.

The modulator 608 can modulate, or add to, the data of the text received from the voice-to-text processor 308 on the carrier wave. The modulation can be one of amplitude modulation, frequency modulation, frequency-shift-key modulation, and other types of modulation.

The power amplifier 610 can increase the power of the text signal so as to increase the range of the radio waves.

The impedance matching circuit 612 can match the impedance of the transmitter 602 to the impedance of an antenna, or a transmission line that leads to the antenna, so as to efficiently transfer power to the antenna. If these impedances are not equal, the power can be reflected back from the antenna toward the transmitter 602, thereby wasting power and at times overheating the transmitter 602. The antenna can be either within the transmitter 602 or outside the transmitter 602. If the antenna is outside the transmitter 602, the antenna may be installed on an outer surface of the self-contained breathing and communication apparatus 102.

Figure 7:
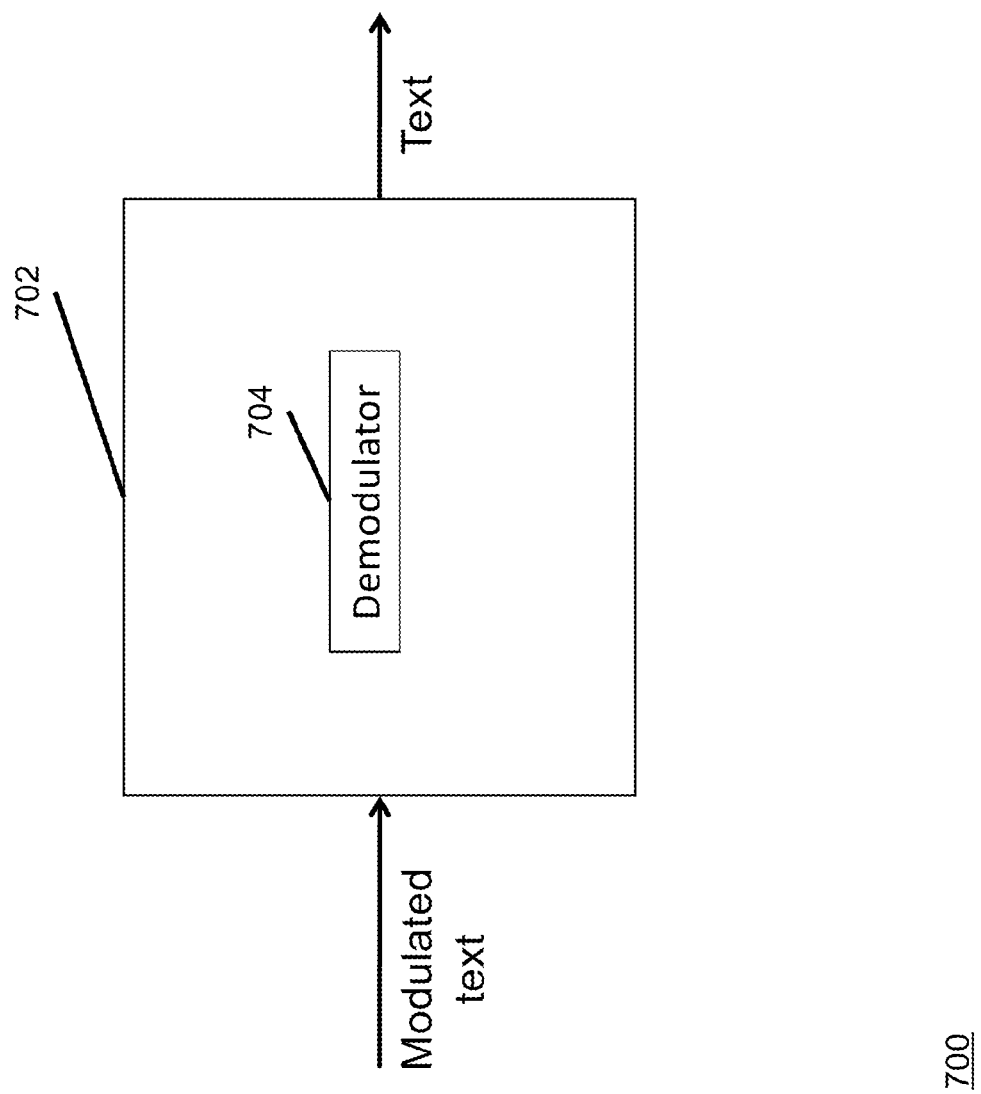
FIG. 7 is a simplified diagram illustrating a receiver of the receiving module.

FIG. 7 is a simplified diagram illustrating a receiver 702 of the receiving module 318. The receiver 702 can include a demodulator 704. The demodulator 704 can receive the modulated text data over the network 206 from the transmitters of other one or more users, and can demodulate the received modulated signal to obtain a usable signal. The receiver 702 sends the usable text signal to the display device 160.

Figure 8:
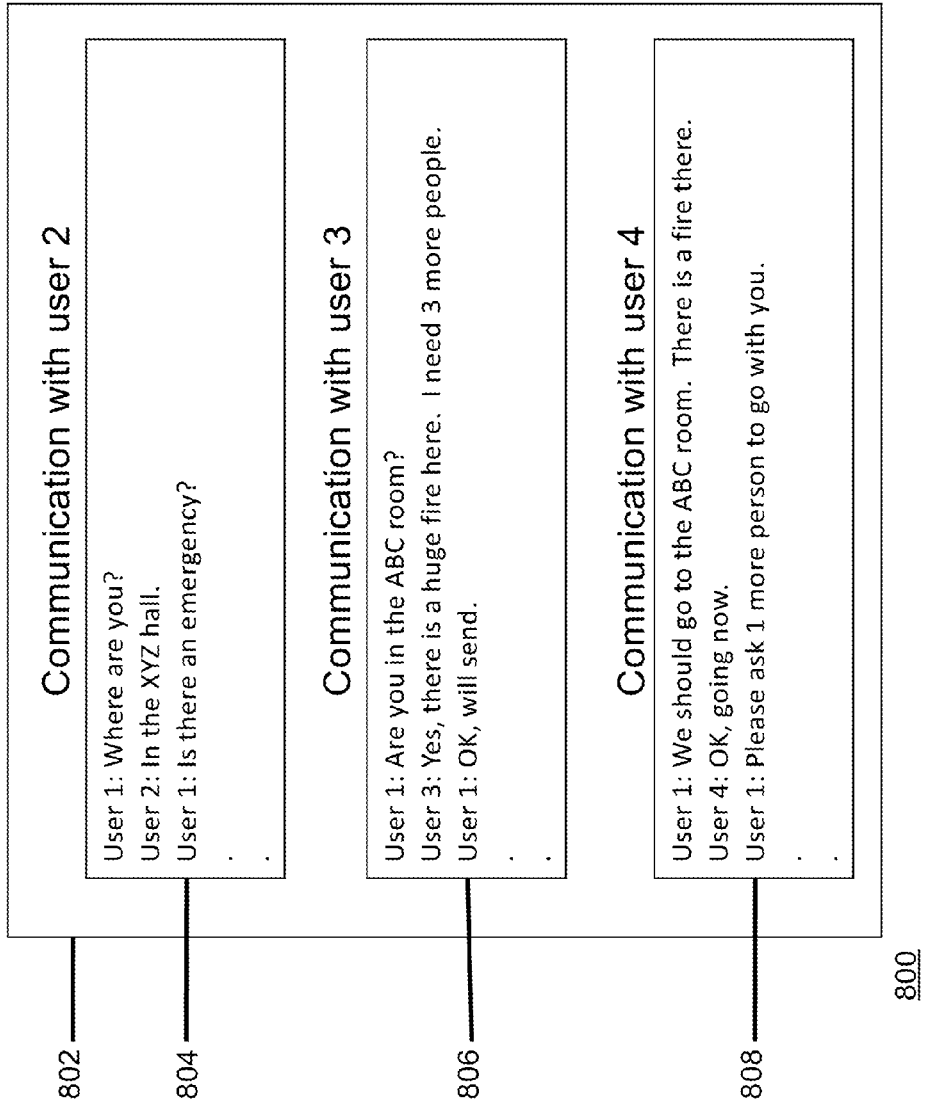
FIG. 8 is a simplified diagram illustrating a graphical user interface of the display device.

FIG. 8 is a simplified diagram 800 illustrating a graphical user interface 802 of the display device 160. The display device 160 can be a transparent organic light emitting diode (OLED) device embedded within the lens of the facemask 104. The display device 160 can display the usable text signal received from other one or more users on the graphical user interface 802.

The graphical user interface 802 can display different windows to a first user, one window for a conversation between the first user and one other user. For example, the window 804 includes a conversation between the first user and a second user, the window 806 includes a conversation between the first user and a third user, and the window 808 includes a conversation between the first user and a fourth user. The windows for conversations between the first user and other users can be shown in an order, such as at least one of: alphabetical order of names of other users, amount of conversation with each user, relevance of conversation with each user, a workplace hierarchy of the users, an emergency required by each user, preference of the first user, and other criteria.

Figure 9:
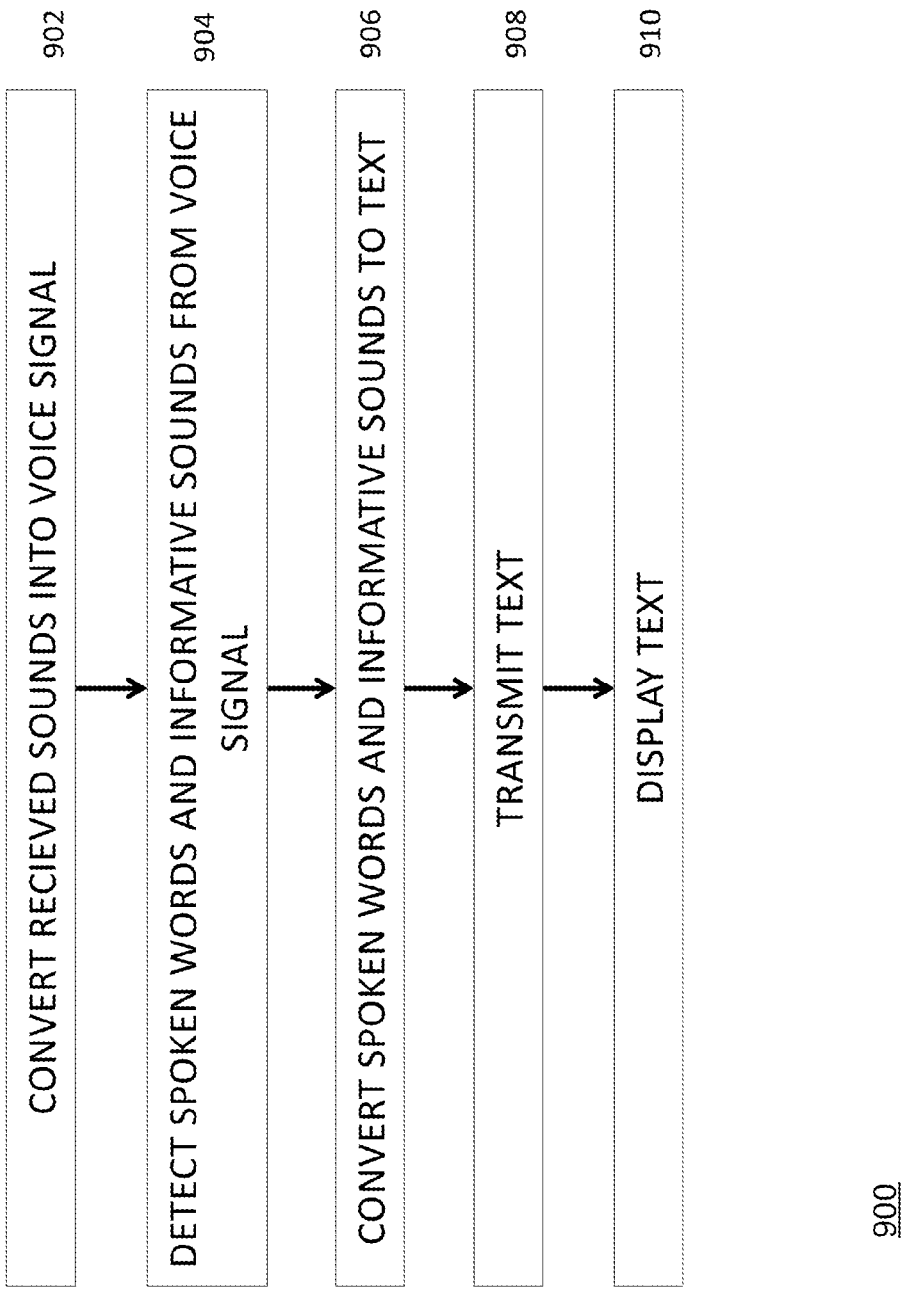
FIG. 9 is a flow diagram illustrating a process of communication between a first user and a second user.

FIG. 9 is a flow diagram 900 illustrating a process of communication between a first user and a second user. A microphone 156 can receive sound when a first user speaks. The microphone 156 can convert, at 902, the recorded sound to a voice signal. A voice activity detection processor 308 can detect, at 904, spoken words and informative sounds of the first user from the converted voice signal. For this detection, the voice activity detection processor 308 can remove noise from the voice signal. A voice-to-text processor 308 can convert, at 906, the detected words and informative sounds to a text message. A transmitter of the transmitting module 316 can transmit, at 908, the text message to a receiver of the second user via a communication network. A display device of the second user can display, at 908, the text message on a graphical user interface.

Figure 10:
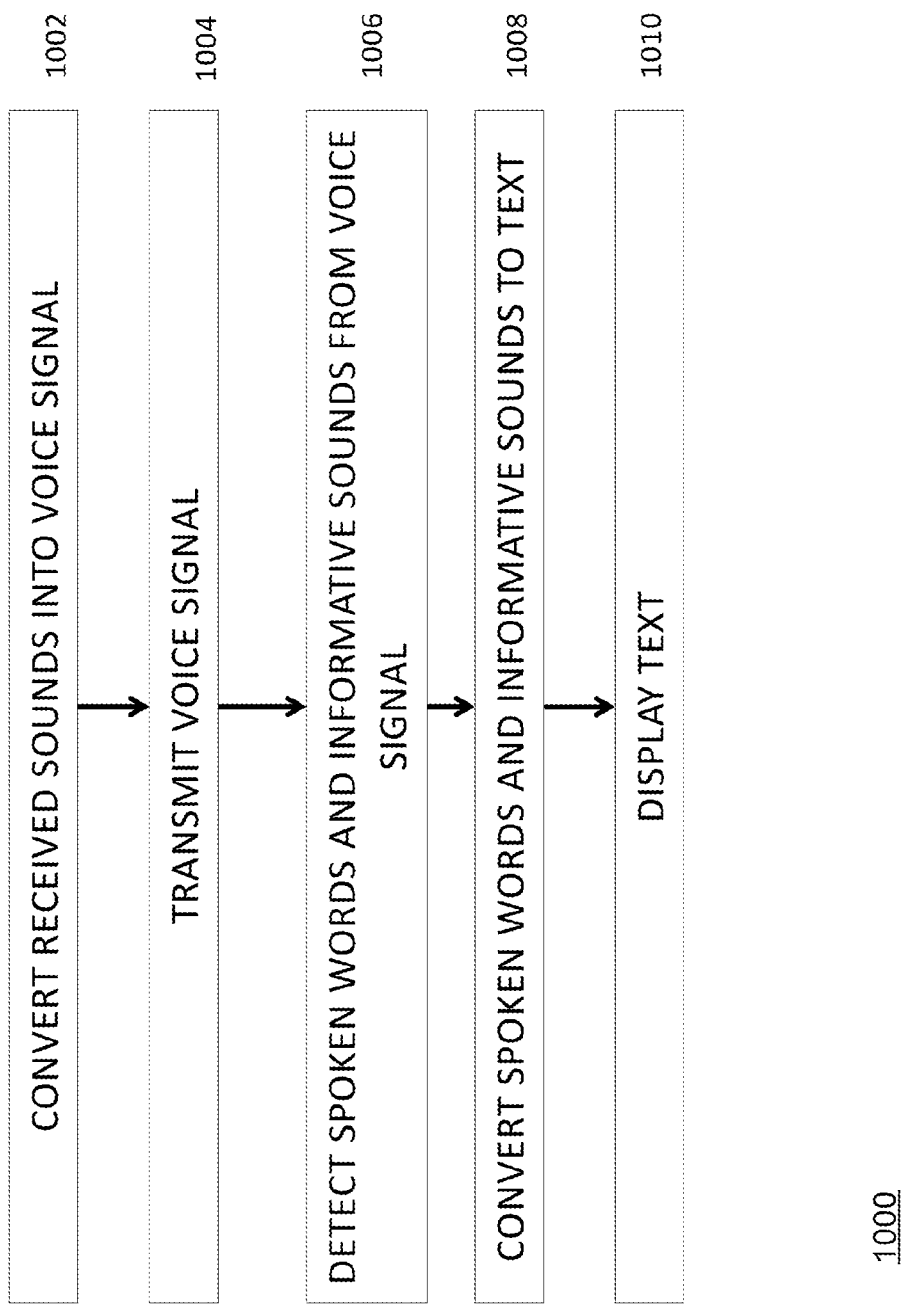
FIG. 10 is a flow diagram illustrating a process of communication between a first user and a second user.

FIG. 10 is a flow diagram 1000 illustrating a process of communication between a first user and a second user, each with a self-contained breathing and communication apparatus as described herein. A microphone can receive sound when the first user speaks and the apparatus generates a voice signal 1002. The voice signal can be transmitted 1004. The voice signal can be received by the second user's self-contained breathing and communication apparatus, and the spoken words and informative sounds can be determined from the voice signal 1004. The spoken words and informative sounds can then be converted to text 1006. After text conversion, the messages send from the first user can be displayed 1010 on the graphical user interface of the second user. If needed, translation from the spoken language of the first user into the selected display language preferred by the second user can take place after the voice signal is received by the second user's self-contained breathing and communication apparatus.

While the apparatus, systems, and methods described herein are discussed in terms of a self-contained breathing and communication apparatus, it should be understood that the apparatus, systems, and methods can operate, or be used, in communications apparatus and systems that do not include a self-contained breathing apparatus. Such apparatus, systems, and methods could be applied in situations wherein it is difficult to receive audio communication due to excessive noise or a need to speak softly. Other situations when such apparatus, systems, and methods that allow voice-to-text communication between at least two users, with or without self-contained breathing apparatus, are useful include when working with someone who cannot hear and comprehend audio communications due to impaired hearing or difficulty with a spoken language.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. A communication apparatus comprising:
    a microphone to receive sound when a user speaks and to convert the received sound into a voice signal;
    a voice activity detection processor to detect spoken words and informative sounds within the voice signal;
    a voice-to-text processor programmed to convert the spoken words and the informative sounds of the voice signal into a text message, wherein the text message includes text identifying the user as originator of the voice signal;
    a transmitter configured to transmit the voice signal, the text message, or both the voice signal and text message to other users;
    a receiver configured to receive one or more voice signals, text messages, or voice signals and text messages from one or more users via a communication network;
    a protective facemask; and
    a display device to display, adjacent or integral to the protective facemask, the one or more text messages from the one or more users.

2. The communication apparatus of claim 1, wherein the user and the other one or more users are firefighters.

3. The communication apparatus of claim 1, wherein the sound received by the microphone includes: the spoken words and the informative sounds by the user, and noise.

4. The communication apparatus of claim 1, wherein the voice signal is an electrical signal characterizing the sound.

5. The communication apparatus of claim 1, wherein the voice activity detection processor comprises:
    an energy based detector to detect voice based on energies within the voice signal;
    a spectral flatness based detector to detect voice based on spectral flatness within the voice signal;
    a sub-band energy based detector to detect voice based on energies of sub-bands within the voice signal;
    a zero crossing rate and absolute value based detector to detect voice based on zero crossing rates and absolute values within the voice signal; and
    a controller to detect the spoken words and the informative sounds by the user based on voice detections by the energy based detector, the spectral flatness based detector, the sub-band energy based detector, and the zero crossing rate and absolute value based detector.

6. The communication apparatus of claim 1, wherein the voice-to-text processor comprises a dictation apparatus to convert the spoken words and informative sounds into the text message.

7. The communication apparatus of claim 6, wherein the voice-to-text processor further comprises a language translator to translate the text message from a first language to a second language.

8. The communication apparatus of claim 1, wherein the transmitter comprises:
    a power supply to provide power to the transmitter;
    an electronic oscillator to generate a carrier wave for transmitting the text message;
    a modulator to modulate a signal characterizing the text message on the carrier wave;
    a power amplifier to vary an amplitude of the signal that is modulated on the carrier wave; and
    an impedance matching circuit to match impedances of antennas of the transmitter and the receiver.

9. The communication apparatus of claim 1, wherein the display device is a transparent organic light emitting diode (OLED) device embedded in a facemask of the user.

10. The communication apparatus of claim 1, further comprising a breathing circuit that provides gas to the user.

11. The communication apparatus of claim 10, wherein the gas is a controlled quantity of oxygen.

12. A method comprising:
    converting sound received from a first user wearing a first self-contained breathing apparatus into a voice signal;
    detecting spoken words and informative sounds by the first user from the voice signal;
    converting the spoken words and the informative sounds into a text message, wherein the text message includes text identifying the first user as originator of the voice signal; and
    transmitting the text message to a second user, the transmitted text message being displayed for the second user on or adjacent to a protective facemask of a second self-contained breathing apparatus.

13. The method of claim 12, wherein a microphone converts the received sound into the voice signal.

14. The method of claim 12, wherein a voice activity detection processor detects the spoken words and informative sounds from the voice signal.

15. The method of claim 12, wherein a voice-to-text processor converts the spoken words and informative sounds into the text message.

16. The method of claim 12, wherein a transmitter transmits the text message to the second user.

17. The method of claim 12, wherein the transmitted text message is displayed on a display device of the second user.

18. A method comprising:
- converting spoken words and informative sounds of a first user wearing a first self-contained breathing apparatus into a voice signal;
- converting the voice signal into a text message, wherein the text message includes text identifying the first user as originator of the voice signal; and
- transmitting the text message to a second user, the transmitted text message, being displayed for the second user on or adjacent to a protective facemask of a second self-contained breathing apparatus.

19. The method of claim 18, wherein:
- a microphone of the first self-contained breathing apparatus converts the spoken words and informative sounds of the first user into the voice signal;
- a voice-to-text processor of the first self-contained breathing apparatus converts the voice signal into the text message; and
- a transmitter of the first self-contained breathing apparatus transmits the text message to the second user.

20. The method of claim 18, wherein a graphical user interface of a display device of the second self-contained breathing apparatus displays the transmitted text.

21. A method comprising:
- converting spoken words and informative sounds of a first user wearing a first self-contained breathing apparatus into a voice signal;
- transmitting the voice signal to a second user;
- converting the voice signal into a visual message, wherein the visual message includes an identifier that the first user is originator of the voice signal;
- displaying the visual message for the second user on or adjacent to a protective facemask of a second self-contained breathing apparatus.

* * * * *